United States Patent

[11] 3,607,309

[72] Inventors Edward S. Olney;
Howard S. Thurmon, both of Deerfield, Ill.
[21] Appl. No. 772,806
[22] Filed Nov. 1, 1968
[45] Patented Sept. 21, 1971
[73] Assignee Kraftco Corporation
New York, N.Y.

[54] PREPARATION OF MARSHMALLOW WITH MILK SOLIDS
5 Claims, No Drawings

[52] U.S. Cl. .................................................... 99/134 A
[51] Int. Cl. .................................................... A23g 3/00
[50] Field of Search ........................................ 99/134

[56] References Cited
UNITED STATES PATENTS
2,847,311  8/1958  Doumak et al. ............. 99/134

OTHER REFERENCES

Richmond, " Choice Confections," 1954 Manufacturing Confectioner Publishing Co., Oak Park, Ill. pages 27, 51 to 53, 265 to 267 (Copy in Gr. 172)

*Primary Examiner*—Joseph M. Golian
*Attorney*—Luedeka, Fitch, Even and Tabin

ABSTRACT: A marshmallow confection containing milk solids and a method for making same are provided. In one process for making the marshmallow confection a syrup is prepared from a mono-saccharide sugar, a di-saccharide sugar and water by heating a mixture of these ingredients with agitation. The syrup mixture is thereafter cooled to a temperature less than the caramelization of milk solids, and a concentrated dispersion of milk solids is added thereto. A dispersion of a colloid, such as gelatin, is then added and the mixture is pumped through a beater so as to aerate the mixture. The mixture is then cooled and formed into pieces of desired shape and size.

PREPARATION OF MARSHMALLOW WITH MILK SOLIDS

The present invention relates to a whipped confection and more particularly relates to a marshmallow confection having improved properties and a method for making same.

Marshmallow is an aerated confection which is considered to be one of the eight basic types of confection in the United States. Marshmallow may have a soft or grained body, elastic and chewy texture, or be semiliquid in character. The basic composition for each kind of marshmallow includes water, a disaccharide sugar, such as sucrose, a monosaccharide sugar, such as dextrose or corn syrup, and a colloid such as gelatin. Satisfactory flavor and coloring materials may also be incorporated into the basic composition.

In preparing marshmallow, the sugars are mixed with water and heated to provide a high solids syrup. The syrup is then mixed with an aqueous dispersion of a colloid, after which the whole is whipped to a desired volume. An aqueous solution of gelatin is usually employed as the colloid, but albumen or other satisfactory colloids may also be used. The bulk density (weight per unit volume) of marshmallow is usually from between about 30 ounces to about 65 ounces per gallon.

Grained marshmallow has a rigid consistency and is composed of suitable sugars in ratios such that one or more of the sugars will crystallize and provide a supporting grained structure. Grained marshmallows may have only surface graining wherein a grained crust is formed retaining an elastic and chewy core, or they may be grained throughout.

Soft marshmallow has an elastic and chewy consistency, and is the type usually associated with the term "marshmallow." Sugar ratios are so regulated that graining does not take place within a reasonable period of time. Soft marshmallow has been formed by casting into desired shapes in starch molds and by extruding and cutting into desired sized pieces.

Marshmallow is distinguished from nougat, which is also recognized as one of the eight basic types of confection. Nougat is a hybrid confection. It has been referred to as a cross between marshmallow and hard candy or as a cross between marshmallow and caramel when milk solids are incorporated as a modifying ingredient. The essential characteristic of nougat is that it is an aerated product produced by combining a low-cooked and a high-cooked batch to provide the desired consistency. In this connection, the bulk density of nougat (weight per unit volume) is considerably higher than the bulk density of marshmallow. When milk solids are present in nougat, the milk solids are cooked in the high-cooked batch to the caramelization point of the lactose sugar present in the milk solids.

It has heretofore been considered difficult or impossible to incorporate milk solids into marshmallow. If the milk solids are added to the sugar-water mixture, which is subsequently cooked to provide the high solids level syrup, the cooking caramelizes the milk solids and provides an undesirable dark color and caramelized taste to the marshmallow. It has also been considered difficult or impossible to add milk solids to the prepared syrup in that milk solids are difficult to rehydrate and little water is available for hydration of the milk solids after the syrup is prepared. Consequently, a marshmallow type product has not been heretofore available with milk solids.

In processes heretofore known for the production of marshmallow, a syrup is first prepared by heating together to temperatures above the caramelization temperature of milk solids a mixture of water, a disaccharide sugar, such as sucrose, and a monosaccharide sugar, such as dextrose, glucose or corn syrup. Other ingredients, such as starch, salt, flavoring agents and the like are also sometimes heated with the syrup mixture. A solution of a colloid, such as gelatin, is then added to the partially cooled syrup. This mixture is then placed in a beater or is otherwise agitated to produce an aerated homogeneous mass. The aerated mass is then further cooled and may be cast into starch molds or extruded or otherwise formed into marshmallow pieces.

As previously indicated, if milk solids were to be incorporated into the mixture which is heated above the caramelization temperature of milk solids to provide the syrup, the milk solids would become caramelized and would provide a color and taste in the final product which is dissimilar to that usually associated with marshmallows. Also, after the syrup has been formed, the moisture of the syrup is substantially bound by the dissolved sugars and little moisture is available for hydration of milk solids. Consequently, the direct addition of milk solids to a cooled syrup may result in nonhydration of the milk solids which would provide a gritty, undesirable mouth feel in the marshmallow.

Accordingly, it is an object of the present invention to provide an improved aerated confection. It is another principal object of the present invention to provide a marshmallow with improved properties. It is a further object of the present invention to provide an improved marshmallow and a method for making same. It is a still further object of the present invention to provide an improved marshmallow confection containing milk solids and a method for making same.

These and other objects of the present invention will become more clear from the following detailed disclosure.

Generally, in accordance with the process of the invention, ingredients which have been heretofore employed in the manufacture of conventional marshmallows are used. However, the present invention is directed to providing marshmallow having milk solids incorporated therein. Milk solids have not been heretofore used in marshmallows.

In general, in a process embodying various of the features of the invention, a syrup is prepared from a monosaccharide sugar, a disaccharide sugar and water by heating a mixture of these ingredients to a temperature wherein the sugars are dissolved. The syrup mixture is thereafter cooled to a temperature less than the caramelization temperature of milk solids and a concentrated dispersion of milk solids is added thereto. The mixture is then further cooled and a dispersion of a colloid is added thereto. The resultant mixture is then pumped through a beater, such as an Oakes beater or other aerating device, and is thereafter cooled and formed into pieces of desired shape and size. The forming may be accomplished by conventional casting in starch molds or may be accomplished by extrusion and cutting into desired length pieces.

The bulk density of the final confection of the invention is desirably maintained between about 30 ounces per gallon and about 65 ounces per gallon. In this connection, the body characteristics, i.e., the bulk density of the product and the degree of gas incorporation therein are, at least in part, a function of the moisture content of the product during whipping or aerating. When marshmallows are formed by a starch casting process, the level of moisture in the formula is maintained at a level somewhat higher than is desired in the final product. After the aerated marshmallow syrup is cast into starch molds, the starch absorbs part of the moisture of the marshmallows. At higher moisture levels in the marshmallow formula, the marshmallow more readily incorporates air with equivalent beating. Consequently, various marshmallow type confections such as the semiliquid and soft marshmallow types, generally have a somewhat lower bulk density within the range specified.

The preferred monosaccharide sugar is corn syrup. The corn syrup may be wholly added at the start of heating the mixture of syrup ingredients, or a portion of the corn syrup may be withheld to facilitate cooling of the syrup mixture. The use of part or all of the corn syrup in preparing the marshmallow syrup mixture is well known to the confection art.

Starch may also be added to the mixture of marshmallow syrup ingredients. The use of starch in the formula facilitates the manufacture of certain types of marshmallow. In general, starch and gelatin are present in about equal amounts, when starch is used, but the amount of starch can exceed the amount of gelatin in some cases. In this connection, the use of certain salts, such as hexametaphosphate, sometimes facilitates the setting of gelatin. It is a general practice in the production of marshmallow to use a salt such as hexametaphosphate to hasten the setting time for the gelatin after forming of the marshmallow. With the marshmallow of the present invention the level of hexametaphosphate may be reduced and in some cases may be completely eliminated without substantially increasing the time of setting of the gelatin. It is believed that the salts introduced into the marshmallow formula by the milk solids provide a similar function to that usually provided by salts such as hexametaphosphate.

In the present invention it is preferred to use milk solids derived from a low fat source, such as skim milk, hereinafter referred to as nonfat milk solids. The nonfat milk solids may be introduced into the marshmallow confection formula at levels of up to about 12 percent by weight of the finished product on a dry basis. It is preferred that the nonfat milk solids be present at a level of at least about 2 percent by weight on a dry basis of the finished product. At levels below about 2 percent there is little advantage obtained by the incorporation of nonfat milk solids into the marshmallow formula. A preferred level of nonfat milk solids is from about 3 to about 7 percent by weight on a dry basis of the finished product. Nonfat milk solids having higher fat levels than is provided by skim milk may also be used. However, the fat level in the finished marshmallow should be less that about 4.0 weight percent on a dry basis to prevent rancid flavors from developing after prolonged storage.

The addition of nonfat milk solids to marshmallow in accordance with the invention provides at least two important improvements: improved flavor and better browning characteristics when toasted. It is believed that the improved browning characteristics are due primarily to the milk protein reacting with various sugars. In this connection, if an improvement in browning characteristics is the primary consideration, other milk protein source material, such as casein, caseinates or whey, may be added to the marshmallow in accordance with the practice of the invention. Casein or caseinates may be substituted par for part for nonfat milk solids at the levels previously indicated. However, due to their high salt level, whey solids, if used, should be used at lower levels to prevent providing an undesirable flavor. The whey solids may be treated by a suitable process, such as electrodialysis, to permit the use of whey solids at higher levels up to the levels previously indicated for nonfat milk solids.

The nonfat milk solids are preferably introduced into the marshmallow formula by first preparing a concentrated dispersion of nonfat milk solids in water. Such dispersion may be prepared by combining dried nonfat milk solids with water or may be prepared by concentrating fluid skim milk. In this connection, it is preferred that the nonfat milk solids be present at a level of at least about 20 weight percent of the dispersion.

The desired final moisture level of the marshmallow syrup which is to be aerated is usually no more than about 20 percent. At moisture levels above about 20 percent the marshmallow syrup may be too thin to aerate. It can be seen that the addition of nonfat milk solids to the syrup in the form of a concentrated dispersion increases the moisture level of the syrup. Consequently, the moisture level of the syrup must be reduced below that usually provided in the manufacture of marshmallow to compensate for the moisture introduced by the nonfat milk solids concentrate.

It is not generally feasible to provide a syrup with more than about 92 percent solids. At solids levels above about 92 percent the syrup becomes unmanageable when cooled below the boiling point. As previously indicated, the milk solids are added to the syrup only after the syrup has been cooled to less than the caramelization temperature of the milk solids. The caramelization temperature of milk solids is about 180° F. Since the syrup is also somewhat diluted by the addition of a colloid, such as gelatin, as a water dispersion, the total level of dried milk solids not fat which can be added by this method is limited by the level of dilution to which the syrup may be subjected. The moisture introduced by the colloid dispersion is usually from about 3 to about 5 percent of the moisture of the marshmallow formula. When the above factors are considered, it is apparent that the maximum level of dried milk solids not fat which can be introduced as a 50 percent by weight concentrated dispersion is about 7 percent by weight on a dry basis.

A marshmallow syrup with milk solids may also be prepared by combining the syrup ingredients, including the milk solids, at a relatively high level of moisture of from about 50 to about 75 percent. Thereafter the combination of ingredients is heated to a temperature less than the caramelization temperature of the milk solids with agitation to provide a syrup. The syrup is then rapidly concentrated in a thin film type continuous evaporation.

In this connection the milk solids may be exposed to temperatures higher than caramelization temperature of milk solids (about 180° F.) for short periods of time. Such exposure, however, should not exceed about 5 minutes and such higher temperature should not exceed about 240° F. The solids level of the syrup is increased at least sufficiently to provide an aeratable syrup, i.e., at least about 80 percent by weight. The solids level may, however, be increased to levels of as high as about 92 percent and may then be reduced to the desired level by adjusting with water.

Milk solids may also be provided in the marshmallow by introducing the skim milk solids into the syrup as a dry powder. This requires special heavy duty, high shear mixing equipment, such as a colloid mill, since, as previously indicated, the milk solids are difficult to hydrate and the water of the syrup is bound tightly by the sugars present in the syrup. Therefore, as previously indicated, it is preferred to introduce the dried milk solids not fat into the syrup in the form of a hydrated concentrate.

The confection of the invention, containing milk solids, may be subjected to other known processes for modifying marshmallows such as drying, coating or coloring.

The following examples further illustrate various features of the present invention, but are intended to in no way limit the scope of the invention which is defined in the appended claims.

EXAMPLE I

A syrup is prepared by adding 49.64 pounds of corn syrup (63 D.E.), 2.0 pounds of water and 22.4 pounds of sucrose into a jacketed mixing kettle and heating the mixture with agitation to a temperature of 250° F. The syrup is maintained at a temperature of 250° F. until sufficient moisture boils off and the solids level of the syrup reaches 90 percent by weight. The syrup is then cooled to a temperature of 170° F. A mixture of 4.25 pounds of nonfat dry milk solids and 4.0 pounds of water is then added to the syrup. The resultant mixture is then cooled to a temperature of 150° F. and a solution of 1.7 pounds of gelatin in 3.2 pounds of water is added thereto. The mixture is then cooled to 135° F. and is standardized to a level of 83 percent by weight solids by the addition of water. The mixture is then transferred to a holding tank and is maintained at a temperature of 135° F. until required for further processing steps.

The mixture is then aerated by transferring the mixture from the holding tank by a pump and through an Oakes beater. After exiting from the Oakes beater the aerated mixture is pumped through a scraped-wall heat exchanger and is cooled to a temperature of 105° F. The aerated mixture at this time has a bulk density of 48 ounces per gallon. The aerated mixture is then transferred to an extruder and is extruded as round ribbons of about 1 inch in diameter. The round ribbons are cut into conventional cylindrical marshmallow pieces by a reciprocating knife. The marshmallow pieces are thereafter tumbled in a starch-sugar mixer and are then packaged.

The marshmallow provided by the above process has a smooth, silky texture and is considered to be of excellent quality having a distinctive flavor imparted by the presence of milk solids. When toasted, the marshmallow of the invention provides a desirable light brown toasted exterior crust while maintaining a desirable nonfluid internal body characteristic.

EXAMPLE II

A dried marshmallow product with milk solids is prepared in accordance with the following. The ingredients listed below are added to a jacketed kettle equipped with a mixer:

| Ingredient | Weight-Lbs. |
|---|---|
| Sweetened condensed skim milk (42% sucrose, 30% milk solids not fat) | 27.63 |
| Sucrose | 42.00 |
| Corn syrup (82% solids, 63 DE) | 11.50 |
| Gelatin solution (28.6% gelatin added at a temperature of 160° F.) | 4.62 |
| Water | 14.06 |

The above ingredients are heated with constant agitation to a temperature of 150° to provide a syrup. The total solids of the syrup is 72 percent by weight. The syrup is then pumped through a Rodney-Hunt turbofilm evaporator operated without vacuum where the solids level is increased to 0.86 percent. The syrup is discharged by gravity from the evaporator at a temperature of 230° F. and is immediately introduced into a water-cooled, scraped surface kettle where the temperature of the syrup is reduced to 135° F. It is desirable to effect cooling of the syrup as soon after discharge from the evaporator as possible to prevent browning of the milk solids. The cooling should be effected within at least about five minutes after the syrup is discharged from the evaporator.

The syrup is then aerated and cooled to a temperature of 105° F. in accordance with the procedure of Example I. Dried marshmallow pieces having a moisture content of 2.5 percent by weight are then prepared from the syrup in accordance with the teaching of U.S. Pat. No. 3,345,186. The dried marshmallow pieces have a milk solids not fat level of 10 percent by weight and have a creamy white color, a short-grained texture and a rich milklike flavor.

EXAMPLE III

Marshmallows containing milk solids but with a conventional level of moisture are prepared by a process similar to Example III. The ingredients listed below are added to jacketed kettle equipped with a mixer.

| Ingredients | Weight Lbs. |
|---|---|
| Corn syrup (82% solids, 63DE) | 122.0 |
| Condensed Skim Milk (30% milk solids not fat) | 100.0 |
| Sucrose | 30.0 |

A syrup is prepared by heating the above ingredients to a temperature of 150° F. with agitation. The syrup contains 63.6 percent by weight solids. The syrup is concentrated to 86.5 percent solids by pumping the syrup through a Rodney-Hunt turbofilm evaporator operated with 14 inches vacuum. The discharge temperature of the syrup is 210° F. The syrup is then immediately transferred to a water-cooled scraped surface kettle where the temperature of the syrup is reduced to 145° F. To the syrup is then added the following ingredients with agitation:

| Ingredient | Weight-Lbs. |
|---|---|
| Gelatin solution (28.6% gelatin added at a temperature of 160° F.) | 7.35 |
| Sodium hexametaphosphate | 0.20 |
| Vanilla | 0.07 |

The syrup is maintained at a temperature in the range of from 140° F. to 150° F. The syrup is then aerated and formed into marshmallow pieces in accordance with the procedure of Example I. The marshmallows have a characteristic milk flavor and a long, resilient body.

EXAMPLE IV

A syrup is prepared in accordance with the procedure of Example I with the exception that the solids level of the syrup is established at 82 percent by weight. The syrup is cooled to a temperature of 140° F. and to the syrup is added sufficient dry nonfat milk solids to provide 4 percent by weight nonfat milk solids in the final product. The mixture is then pumped by means of a positive displacement pump through a colloid mill having carborundum stones. The setting of the mill stones is adjusted to provide a 15° F. temperature rise in the mixture as it is passed through the mill. The mixture is then cooled to 135° F. and a gelatin solution (28.6% gelatin) at a temperature of 160° F. is added, at a level sufficient to provide 1.3 percent by weight gelatin in the finished product. The syrup is then standardized to a level of 83 percent by weight solids by the addition of water.

The mixture is aerated and prepared into marshmallow pieces as further described in Example I. The marshmallow product has a smooth, nongrainy texture, a characteristic milk flavor and is considered to be of excellent quality.

The present invention provides a unique marshmallow confection and a method for making such marshmallow. The marshmallow confection of the invention has improved melting characteristics and a unique milklike flavor.

What is claimed is:

1. A method for making a marshmallow type confection containing noncaramelized milk solids comprising providing a mixture of a disaccharide, a monosaccharide, water and a milk protein source selected from milk solids not fat, casein, caseinates or whey, heating said mixture to a temperature less than the caramelization temperature of said milk protein source to provide a syrup, thereafter increasing the level of solids of said syrup by vacuum evaporation, cooling said concentrated syrup, aerating said concentrated syrup, and forming marshmallow pieces therefrom, said evaporation and cooling step being effected so that the temperature of said syrup is not above about 240° F. for a period greater than about 5 minutes.

2. A method in accordance with claim 1 wherein said mixture has from about 50 to about 75 percent by weight of total solids.

3. A method in accordance with claim 1 wherein said solids level of said syrup is increased to from about 80 to about 92 percent by weight.

4. A method in accordance with claim 1 wherein the milk protein source is milk solids not fat.

5. A method in accordance with claim 4 wherein the milk solids not fat are provided by condensed skim milk.